Figure 1:
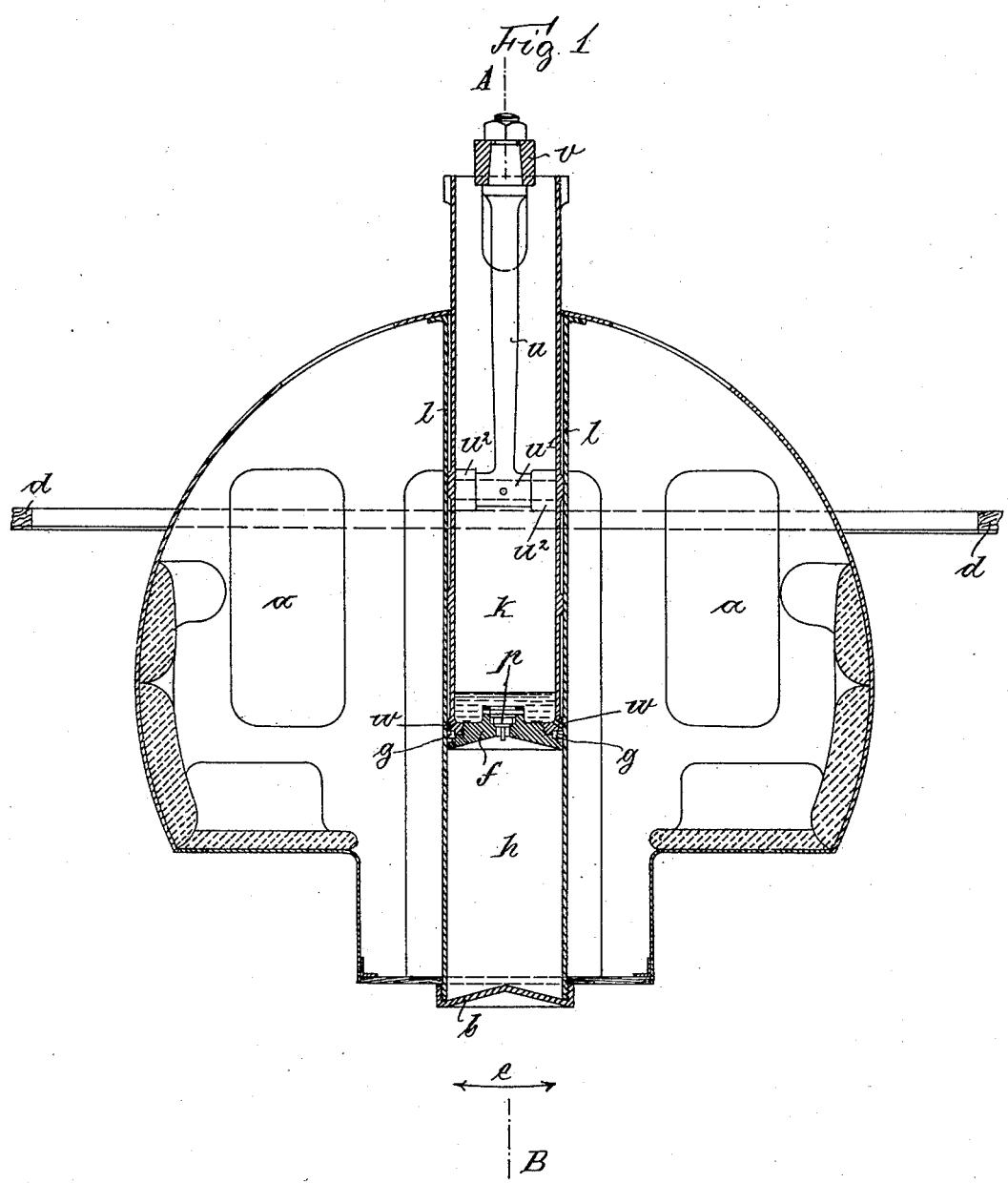

No. 713,806. Patented Nov. 18, 1902.
W. SCHMIDT.
DEVICE FOR PREVENTING SEASICKNESS.
(Application filed June 25, 1902.)

(No Model.) 2 Sheets—Sheet 1.

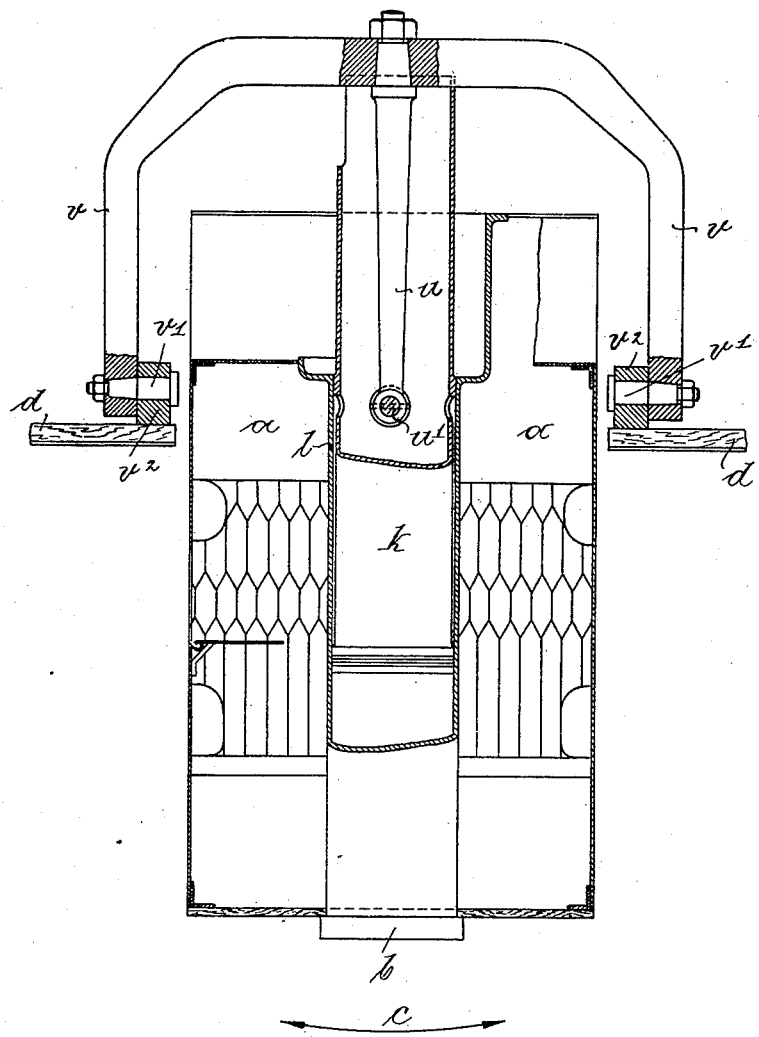

UNITED STATES PATENT OFFICE.

WILHELM SCHMIDT, OF WILHELMSHÖHE, NEAR CASSEL, GERMANY.

DEVICE FOR PREVENTING SEASICKNESS.

SPECIFICATION forming part of Letters Patent No. 713,806, dated November 18, 1902.

Application filed June 25, 1902. Serial No. 113,158. (No model.)

*To all whom it may concern:*

Be it known that I, WILHELM SCHMIDT, a subject of the King of Prussia, German Emperor, and a resident of Wilhelmshöhe, near Cassel, in the German Empire, have invented certain new and useful Improvements in a Device for Preventing Seasickness, of which the following is an exact specification.

My invention relates to improvements in a device for preventing seasickness, and more especially to improvements in the device described in my former application for Letters Patent, filed September 27, 1901, Serial No. 76,771, and has especially for its purpose to provide means for effecting the good tightening of the piston in the cylinder to which the cabin, seat, or the like is fixed.

My invention is represented in the accompanying drawings, in which—

Figure 1 is a vertical section of a cabin provided with my new arrangement. Fig. 2 is a vertical section of the same on line A B of Fig. 1.

In ships three movements arise which effect the seasickness of the passengers—that is to say, first, the oscillations around the longitudinal axis of the hull, so-called "rolling;" second, the oscillations around the cross-axis, so-called "pitching," and, third, the up-and-down motion of the whole hull. The rolling and pitching movement of the hull is dispensed with in the well-known manner by suspending the cabin so as to allow a free swinging of the same within the ship-hull, while the up-and-down motion of the whole hull is dispensed with by arranging the cabin in that way that it is constantly carried or supported by steam or air pressure. For this purpose I fix the cabin to a cylinder in which a piston is movable, which piston is suspended so as to allow a free swinging of the whole cabin.

It will be clear that the construction may be modified by fixing the cabin to the piston and suspending the cylinder. For supporting the cabin, steam or air pressure may be used; but instead of using an overpressure of the air a vacuum may be created on one side of the piston, so that the cabin is supported by the atmospheric air. By supporting the cabin by a pressure which is always kept constant, as may be attained by the arrangement of a great reservoir, or, as in case of using a vacuum wherein the atmospheric pressure remains practically constant, the result attained is that the cabin will not follow the up-and-down movements of the ship-hull, as there is no power which can effect the movement of the cabin—*i. e.*, by means of which the vis inertia of the cabin would be overcome.

In the example shown in the accompanying drawings a vacuum shall be created on one side of the piston, which piston is suspended so as to allow a free swinging, hereby dispensing with the rolling and pitching movement of the ship, by means of which vacuum it is attained that the cabin is supported by the atmospheric pressure, hereby dispensing with the up-and-down motion of the cabin. It will be clear that these up-and-down motions are theoretically perfectly done away with; but in practice it has proved that in consequence of the friction always small movements can arise, especially in consequence of the piston being fitted very tightly into the cylinder, which is absolutely necessary in order to create and hold up the vacuum. It is therefore very important to find out a tightening for the piston, by means of which tightening the friction is reduced to a minimum. I attain this by the construction forming the object of the present invention, which construction shall be described in the example shown in the accompanying drawings.

$l$ is a cylinder to which the cabin $a$ is fixed and which is closed on its lower end by means of the cover $b$.

$k$ is a cylindrical piston situated in the cylinder $l$. The cylindrical piston $k$ is suspended by means of a rod $u$, in which rod the bolt $u'$ is fixed. This bolt $u'$ is journaled in bearings $u^2$, fixed to the inside of the cylinder $k$, hereby allowing a swinging of the cabin in the direction of the arrow $c$, Fig. 2. The rod $u$ is fixed in a bow $v$, which bow is journaled, by means of the bolts $v'$, in bearings $v^2$, fixed to the deck $d$ or any other convenient fixed point of the ship. As the bow $v$ allows a swinging of the cabin in the direction of the arrow $e$, Fig. 1, it will be clear that by this arrangement the cabin can swing freely in all directions. The tightening of the piston $k$ in the cylinder $l$ is effected by pouring a liquid, advantageously a liquid which does not easily evaporate—as, for instance, oil or the like—into the cylindrical piston. In the bottom $f$ of the cylindrical piston an annular channel $g$ is provided, which channel is connected, by means of the holes $w$, to the inside of the piston, so that the oil can flow through the holes $w$ into the annular channel $g$, hereby effecting a tightening of the piston in the cylinder. It will be understood that on account of a vacuum being created in the room $h$ underneath the piston the atmospheric pressure will tend always to press the oil into the small spaces which might occur and allow the air to enter into the room $h$, so that the entering of air into this room is perfectly dispensed with at the same time, creating a tightening without great friction.

For easily creating a vacuum a valve $p$ is provided in the bottom $f$ of the cylindrical piston $k$, which valve allows air to leave but not to enter the room $h$ underneath the piston. If now the cabin is raised until the bottom $b$ of the cylinder touches the bottom $f$ of the piston, so that no more air is situated between these two bottoms, and the cabin is loaded so that the same sinks a vacuum is created underneath the piston $k$, as the valve $p$ does not allow any air to pass. It will be clear that in case still small quantities of air really enter the room $h$ the vacuums can be easily created again by raising the cabin $a$. By this raising of the cabin the oil which by the pressure of the atmospheric air is pressed into the room $h$ is brought through the valve $p$ back upon the bottom $f$ of the piston $k$. The valve $p$ is perfectly covered by the oil or the like, so that this valve is also tightened by the liquid.

Having thus fully described the nature of this invention, what I desire to secure by Letters Patent of the United States is—

1. In a device for preventing seasickness, the combination of a cylinder closed on its lower end, seats or cabins fixed to this cylinder, with a piston situated in this cylinder and covered by a liquid, and means for suspending the piston so as to allow a free swinging of the same, substantially as described and for the purpose set forth.

2. In a device for preventing seasickness, the combination of a cylinder closed on its lower end, seats or cabins fixed to this cylinder, with a piston situated in this cylinder and covered by a liquid, a valve provided in this piston, and means for suspending the piston so as to allow a free swinging of the same, substantially as described and for the purpose set forth.

3. In a device for preventing seasickness, the combination of a cylinder closed on its lower end, seats or cabins fixed to this cylinder, with a piston situated in this cylinder and covered by a liquid, a valve provided in this piston, an annular groove provided in the cylindrical surface of said piston, holes connecting this annular groove with the upper side of the piston, and means for suspending the piston so as to allow a free swinging of the same, substantially as described and for the purpose set forth.

In testimony whereof I have signed my name to this specification in the presence of two subscribing witnesses.

WILHELM SCHMIDT.

Witnesses:
  WOLDEMAR HAUPT,
  WILHELM MAYNER.